(12) United States Patent
Bondurant et al.

(10) Patent No.: US 9,583,130 B2
(45) Date of Patent: Feb. 28, 2017

(54) METHODS FOR CONTROL OF DIGITAL SHREDDING OF MEDIA

(75) Inventors: Matthew D. Bondurant, Superior, CO (US); S. Christopher Alaimo, Boulder, CO (US)

(73) Assignee: Imation Corp., Oakdale, MN (US)

( * ) Notice: Subject to any disclaimer, the term of this patent is extended or adjusted under 35 U.S.C. 154(b) by 1916 days.

(21) Appl. No.: 12/199,366

(22) Filed: Aug. 27, 2008

(65) Prior Publication Data

US 2009/0094228 A1 Apr. 9, 2009

Related U.S. Application Data

(60) Provisional application No. 60/977,783, filed on Oct. 5, 2007.

(51) Int. Cl.
G06F 12/16 (2006.01)
G11B 19/02 (2006.01)
G06F 12/12 (2016.01)

(52) U.S. Cl.
CPC .............. *G11B 19/02* (2013.01); *G06F 12/12* (2013.01)

(58) Field of Classification Search
None
See application file for complete search history.

(56) References Cited

U.S. PATENT DOCUMENTS

| | | | |
|---|---|---|---|
| 5,794,252 A | 8/1998 | Bailey et al. | |
| 6,779,080 B2 * | 8/2004 | Basham et al. | 711/112 |
| 7,107,416 B2 * | 9/2006 | Stuart et al. | 711/159 |
| 7,529,816 B2 | 5/2009 | Hayden et al. | |
| 7,574,501 B2 | 8/2009 | Louie et al. | |
| 2003/0187863 A1 | 10/2003 | Kohut et al. | |
| 2005/0149682 A1 | 7/2005 | Kim | |
| 2005/0267920 A1 | 12/2005 | Helliker et al. | |
| 2006/0010301 A1 * | 1/2006 | Yagawa | 711/163 |
| 2006/0123232 A1 * | 6/2006 | Cannon et al. | 713/165 |

(Continued)

OTHER PUBLICATIONS

"Digital File Shredder Pro—Military and Professional Grade Data Shredding for Consumers," California Science and Technology News, Oct. 7, 2005, retrieved from internet, 1 page.

(Continued)

*Primary Examiner* — Christian P Chace
*Assistant Examiner* — Eric Loonan
(74) *Attorney, Agent, or Firm* — Sunstein Kann Murphy & Timbers LLP

(57) ABSTRACT

According to the disclosure, a unique and novel archiving system that allows the digital shredding of archived data is disclosed. Embodiments of the archiving system include removable disk drives that store data, which may be erased such that the data is considered destroyed but that allows the removable disk drive to be reused. The archiving system can determine which data should be erased. Then, the data is digitally shredded such that the removed data cannot be retrieved or deciphered. In alternative embodiments, a protection may be placed on the data required to be kept because the data is associated with a legal suit. This "legal hold" prevents the data from being digitally shredded. As such, the archiving system can provide a system that can dispose of data on a file-by-file or granular level without physically destroying the media upon which the data is stored.

3 Claims, 11 Drawing Sheets

(56) References Cited

U.S. PATENT DOCUMENTS

| | | |
|---|---|---|
| 2006/0178281 A1 | 8/2006 | Alasri |
| 2007/0192478 A1 | 8/2007 | Louie et al. |
| 2008/0059444 A1 | 3/2008 | Singh et al. |
| 2008/0059531 A1 | 3/2008 | Singh et al. |
| 2008/0155208 A1 | 6/2008 | Hiltgen et al. |
| 2008/0178281 A1 | 7/2008 | Narayanaswami et al. |
| 2009/0013409 A1 | 1/2009 | Wenzinger et al. |
| 2009/0094245 A1 | 4/2009 | Kerns |
| 2012/0089575 A1 | 4/2012 | Kerns |

OTHER PUBLICATIONS

EP International Search Report mailed Nov. 20, 2008, Application No. 08165712.4-1232, 15 pages.

* cited by examiner

METHODS FOR CONTROL OF DIGITAL SHREDDING OF MEDIA

CROSS-REFERENCES TO RELATED APPLICATIONS

This application claims priority to U.S. Provisional Patent Application Ser. No. 60/977,783, filed Oct. 5, 2007, entitled "METHODS FOR CONTROL OF DIGITAL SHREDDING OF MEDIA,", which is hereby incorporated herein in its entirety.

BACKGROUND

Embodiments of the disclosure generally relate to storage systems and, more specifically, but not by way of limitation, to archiving storage systems.

An archiving storage system is used by one or more applications or application servers to store data for longer periods of time, for example, one year. Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage.

Generally, organizations may discard the data at some point. However, due to the sensitive nature of the data, e.g., personal information, confidential information, or secret information, the data is discarded in a safe and secure manner. Some archiving systems physically destroy the media storing the data. However, this solution may also discard a valuable resource—the media itself. In some situations it may be beneficial to keep the media but destroy the data on the media.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
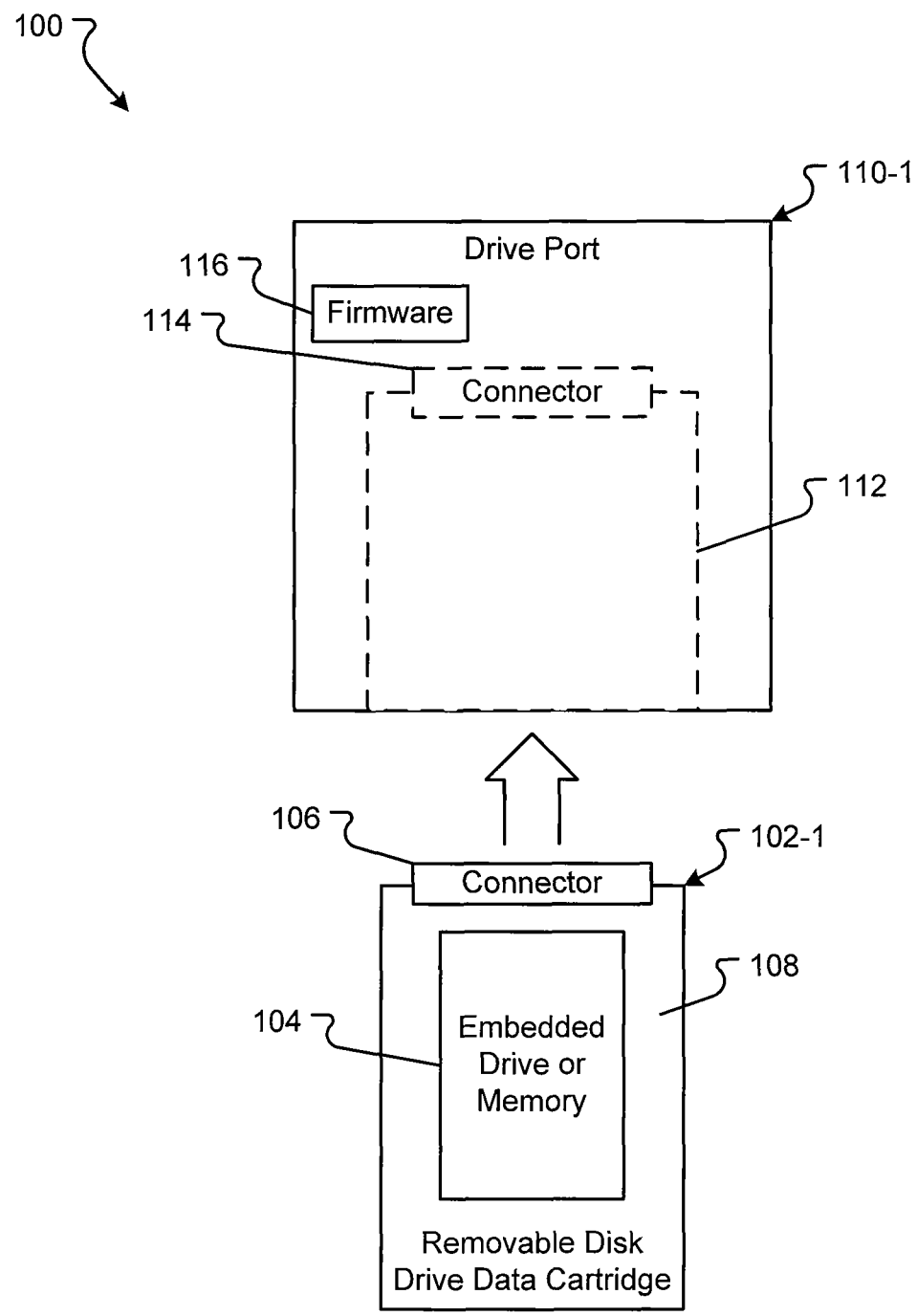
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide a unique and novel archiving system. Embodiments include an archiving system having removable hard disk drives embedded in removable disk cartridges, referred to simply as removable disk drives. The removable disk drives allow for expandability and replacement such that the archiving system need not be duplicated to add new or more storage capacity. Further, the removable disk drives provide advantages in speed and data access because, in embodiments, the data is stored and retrieved by random access rather than sequential access. In embodiments, the removable disk drives store data that may be erased such that the data is considered destroyed but that allows the removable disk drive to be reused. The archiving system can determine which data should be erased. Then, the data is digitally shredded such that the reclaimed memory cannot be read to decipher the erased data. In alternative embodiments, a protection may be placed on data required to be kept because the data is associated with a legal suit. This "legal hold" prevents the data from being altered, deleted, or digitally shredded. As such, the archiving system can provide a system that can dispose of data on a file-by-file basis or on a granular level without physically destroying the media upon which the data is stored.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

An embodiment of a removable disk system 100 to provide long-term archival data storage is shown in FIG. 1. A removable disk drive 102-1 provides storage capability for the removable disk system 100. In embodiments, the removable disk drive 102-1 includes a data cartridge case 108 and an embedded memory 104, which may be an embedded hard disk drive (HDD), solid state disk (SSD), solid state drive, or flash memory. The HDD or flash memory 104 provides a random access memory for storage of archived data. The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component and the connector protrudes from the data cartridge case 108. The data cartridge case 108, in embodiments, provides a solid container for the embedded memory 104 that also functions as an easily swappable or changed case when interchanging removable disk drives 102-1 in the removable disk system 100.

The embedded memory 104, in embodiments, is not physically destroyed easily and is reusable if the data in the memory is removed, erased, altered, or changed. For example, the removable disk drive is a hard drive that includes a magnetic media. If the data on the magnetic media is to be physically destroyed, the magnetic media would need to be removed and destroyed in an industrial shredder or other device that physically destroys the media. However, the data on the hard drive may be altered allowing the hard drive to be reused without allowing the data to be retrieved.

In embodiments, the removable disk system 100 contains a drive port 110-1 that includes one or more data cartridge ports 112, each with a data cartridge connector 114 to receive the removable disk drive 102-1. The data cartridge connector 114 mates with the electrical connector 106 of the removable disk drive 102-1 to provide an electrical connection to the removable disk drive 102-1 and/or to communicate with the embedded memory 104 in the removable disk drive 102-1. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the data cartridge case 108 of the removable disk drive 102-1 to be easily inserted and removed as necessary. In embodiments, the drive port 110-1 includes two or more data cartridge ports 112 to allow for the use, control and communication with two or more removable disk drives 102-1. Each drive port 110-1, in embodiments, is separately addressable to allow for customized control over each removable disk drive 102-1 connected to each data cartridge port 112. Thus, as removable disk drives 102-1 are replaced, the same controls can be applied to the newly inserted removable disk drives 102-1 because the drive port 110-1 is addressed instead of the removable disk drives 102-1.

The embedded memory 104 may be read and used by the firmware 116 of the drive port 110-1. The firmware 116 may be hardware and/or software resident in the drive port 110-1 for controlling the removable disk drive 102-1. In embodiments, the firmware 116 contains the necessary software and/or hardware to power-up the removable disk drive 102-1, spin-up the disk platters in the embedded memory 104, read and write to the embedded memory 104, read, write and process metadata, etc. For example, the firmware 116 could read the embedded memory 104 to identify the removable disk drive 102-1 and gather information related to its contents.

In embodiments, the removable disk system 100 operates to receive one or more removable disk drives 102-1 in the one or more drive ports 110-1. The electrical connector 106 physically connects or couples with the data cartridge connector 114 to form an electrical connection that allows the drive port 110-1 to communicate with the embedded memory 104. The firmware 116 powers-up the embedded memory 104 and begins any initialization processes (e.g., security processes, identification processes, reading and/or writing, etc.). The drive port 110-1, which, in embodiments, is in communication with a network, receives archival data from one or more servers, applications, or other devices or systems on the network. The firmware 116 writes the archival data to the embedded memory 104 of the removable disk drive 102-1 to archive the data.

Figure 2:
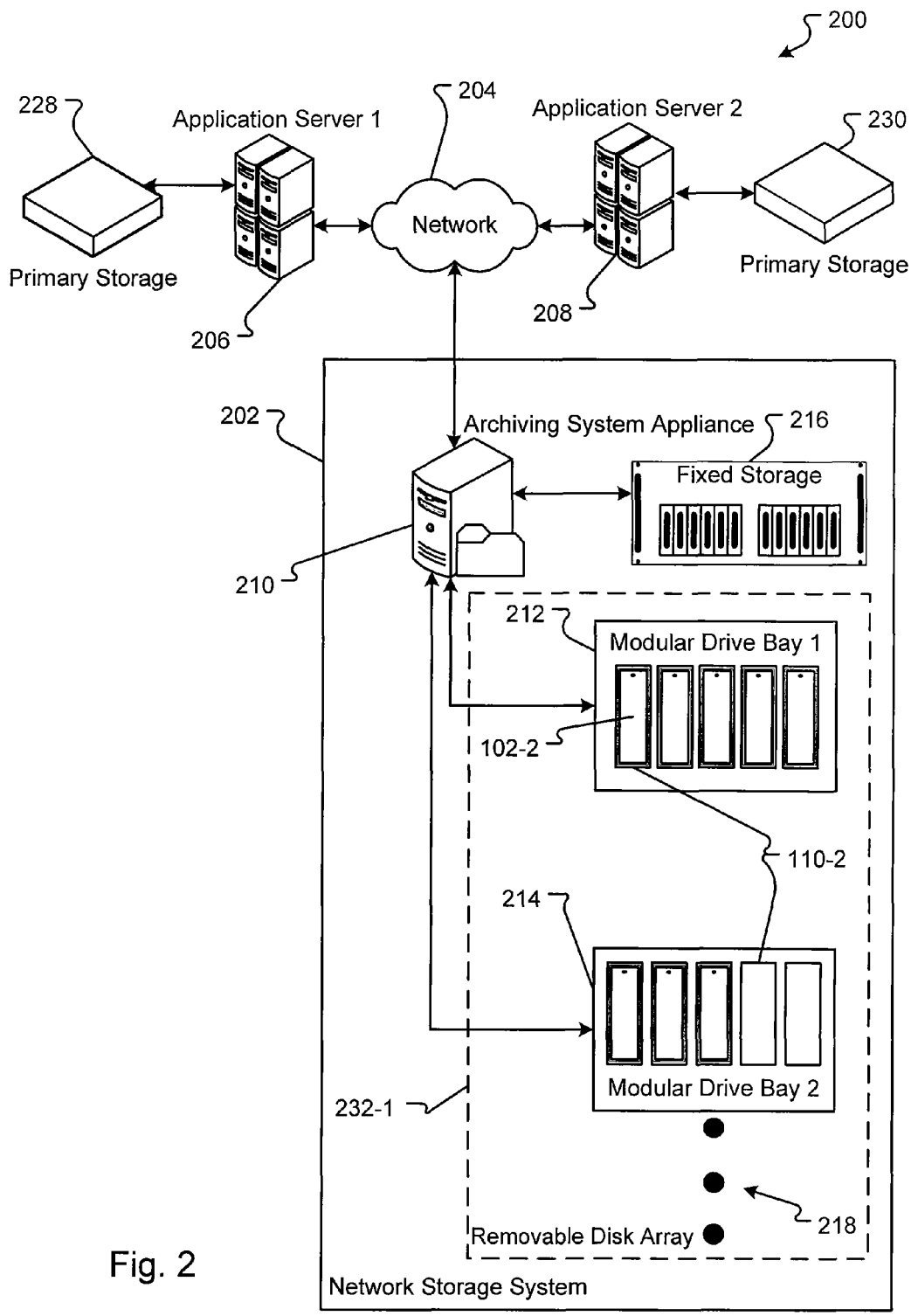
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes an archiving system appliance 210 and one or more removable disk drives 102-2 connected or in communication with a drive port 110-2. In alternative embodiments, a modular drive bay 212 and/or 214 includes two or more drive ports 110-2 that can each connect with a removable disk drive 102-2. Thus, the modular drive bays 212 and 214 provide added storage capacity because more than one removable disk drive 102-2 can be inserted and accessed using the same archiving system appliance 210. Further, each drive port 110-2 in the modular drive bays 212 and 214 are, in embodiments, separately addressable allowing the archiving system appliance 210 to configure the removable disk drives 102-2 in the modular drive bays 212 and 214 into groups of one or more removable disk drives 102-2. Two or more modular drive bays 212 and 214, in embodiments, are included in the network storage system 202, as evidenced by the ellipses 218. Thus, as more data storage capacity is required, more modular drive bays 212 and 214 may be added to the network storage system 202.

The exemplary hardware architecture in FIG. 2 provides near limitless capacity as more removable disk drives 102-2 can be added to existing modular drive bays 212 or 214 until the modular drive bays 212 and 214 hold all possible removable disk drives 102-2. Then, more modular drive bays 212 and 214 are added to the network storage system 202. Further, removable disk drives 102-2 may be replaced as the removable disk drives 102-2 near their storage capacity. The removed disk drives 102-2, in embodiments, are physically stored if and until the data on the removable disk drives 102-2 needs to be retrieved. If the data on the removable disk drive 102-2 needs to be retrieved, the removable disk drive 102-2 may be inserted into one of the drive ports 110-2 of the modular drive bay 212 or 214, and the information retrieved from the connected removable disk drive 102-2.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

The archiving system appliance 210, in embodiments, is a closed system that only allows access to the network storage system 202 by applications or other systems and excludes access by users. Thus, the archiving system appliance 210 provides protection to the network storage system 202.

In embodiments, the two or more modular drive bays 212 and/or 214, having each one or more inserted removable disk drives 102-2, form a removable disk array (RDA) 232-1. The archiving system appliance 210 can configure the RDA 232-1 into one or more independent file systems. Each application server 206 or 208 requiring archiving of data may be provided a view of the RDA 232-1 as one or more independent file systems. In embodiments, the archiving system appliance 210 logically partitions the RDA 232-1 and logically associates one or more drive ports 110-2 with each application layer partition. Thus, the one or more removable disk drives 102-2 comprising the application layer partition appears as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 102-2. For example, the application server 1 206 stores archival data in a first application layer drive, such as, the first three removable disk drives. The application layer drives are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture. In embodiments, the archival data is also referred to as an information element and may include, but is not limited to, a file, a memory sector, a data structure, a table, or other type or format of data.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 102-2. If the data is needed in the short term, the archiving system appliance 210 retrieves the data from the fixed storage 216.

The archiving system appliance 210 can also configure the active archive in the fixed storage 216 into one or more independent file systems, as with the RDA 232-1. As explained above, each application server may be provided a view of one of two or more independent file systems. Each independent file system may comprise an application layer partition in the RDA 232-1 and a related application layer partition in the fixed storage 216. In embodiments, the archiving system appliance 210 partitions the fixed storage 216 and associates each application layer partition in the fixed storage 216 with an associated application layer partition in the RDA 232-1.

As explained above, the archiving system appliance 210, in embodiments, determines where and how to store the data to one or more removable disk drives 102-2. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the related application layer partitions in both the fixed storage 216 and the RDA 232-1, which may comprise one or more of the removable disk drives 102-2 in one or more of the drive ports 110-2. The archival data is written to the removable disk drive 102-2 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 102-2 and a different portion of the fixed storage 216 because the archival data from application server 2 208 relates to a different application and, thus, a different application layer partition.

Figure 3:
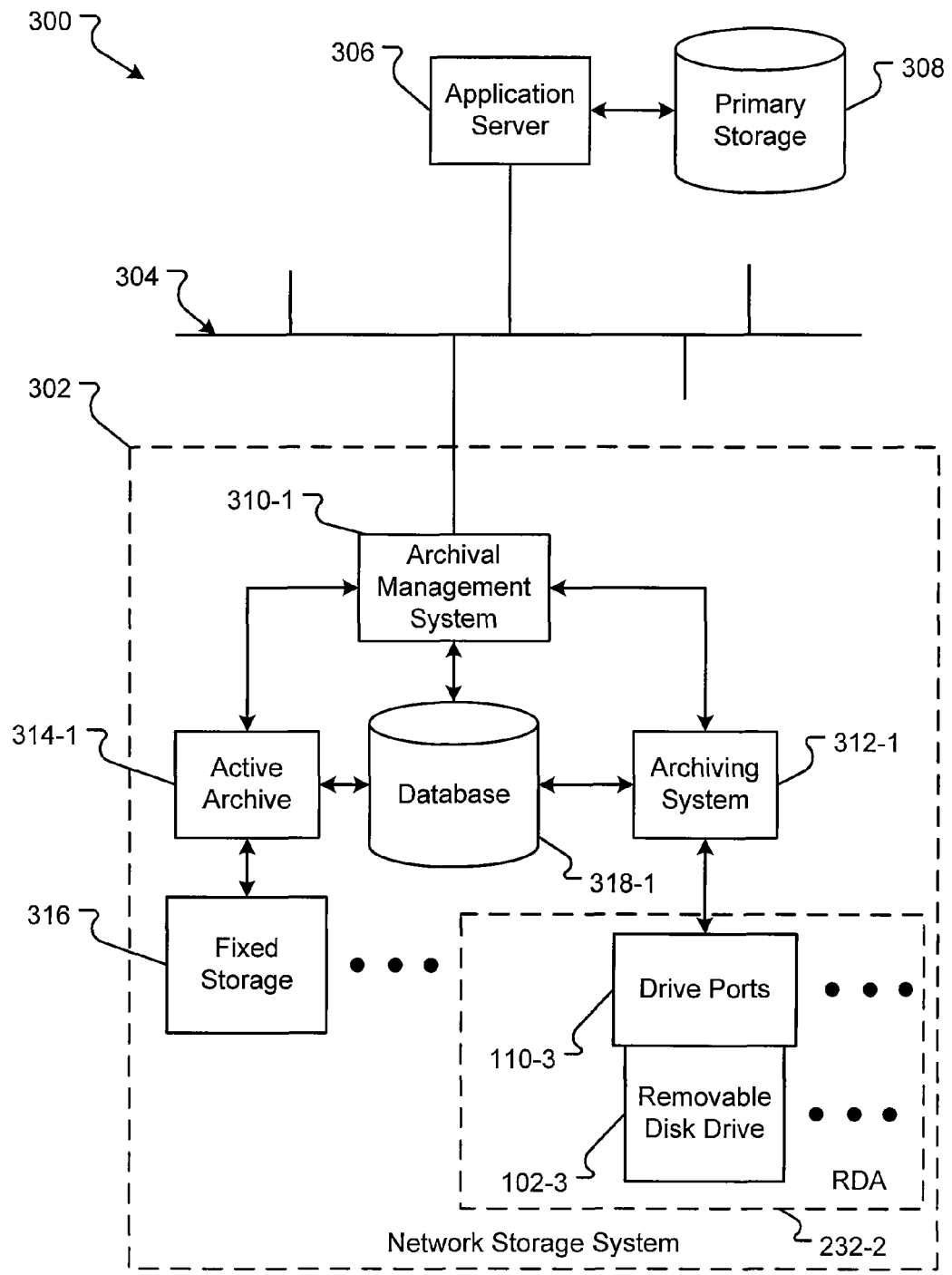
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312-1 in communication with one or more drive ports 110-3 that are in communication with one or more removable disk drives 102-3. The drive ports 110-3 and removable disk drives 102-3 are similar in function to those described in conjunction with FIG. 1. The archiving system 312-1 controls the function of the one or more drive ports 110-3 and writes the archived data to one or more predetermined removable disk drives 102-3 in the one or more drive ports 110-3.

In further embodiments, the network storage system 302 comprises an archival management system 310-1. The archival management system 310-1 receives data for archiving from one or more systems on the network 304. Further, the archival management system 310-1 determines to which system or removable disk drive 102-3 the data should be archived, in which format the data should be saved, and how to provide security for the network storage system 302. In embodiments, the archival management system 310-1 provides a partitioned archive such that the network storage system 302 appears to be an independent file system to each separate application server 306, yet maintains the archive for multiple application servers 306. Thus, the archival management system 310-1 manages the network storage system 302 as multiple, independent file systems for one or more application servers 306. In embodiments, the archival management system 310-1 and the archiving system 312-1 are functional components of the archiving system appliance 210 (FIG. 2).

In embodiments, the archival management system 310-1 saves archival data to both the archiving system 312-1 and an active archive 314-1. The active archive 314-1, in embodiments, controls, reads from and writes to one or more fixed storage devices 316 that allow easier access to archived data. In embodiments, fixed storage 316 is similar in function to fixed storage 216 (FIG. 2). The active archive 314-1 performs similar functions to the archiving system 312-1 but for the fixed storage devices 316. In embodiments, the active archive 314-1 and the fixed storage devices 316 are components of the hardware fixed storage system 216 (FIG. 2). In alternative embodiments, the active archive 314-1 partitions the fixed storage 316 to mirror the associated application layer partitions in the RDA 232-2. The application layer partition(s) in the active archive 314-1 may have boundaries associated with memory addresses in the fixed storage 316.

The archival management system 310-1 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310-1 can apply controls to different portions of the RDA 232-2 and the active archive 314-1 according to user-established data storage requirements. In one embodiment, the archival management system 310-1 creates application layer partitions in the archive that span one or more removable disk drives 102-3 and one or more portions of the fixed storage 316. All data to be stored in any one application layer partition can have the same requirements and controls. Thus, requirements for data storage are applied to different drive ports 110-2 (FIG. 2) in the modular drive bays 212 and 214 (FIG. 2) and to the removable disk drives 102-2 (FIG. 2) stored in those drive ports 110-2 (FIG. 2). Further, the requirements are likewise applied to different portions of the fixed storage 316 in the active archive 314-1. If a removable disk drive is replaced, the same storage requirements, in embodiments, are applied to the replacement removable disk drive 102-3 because of its location in the controlled drive port. As such, the archival management system 310-1 can individually maintain separate sets of data using different controls, even in different removable disk drives.

The network storage system 302 may also comprise a database 318-1 in communication with the archival management system 310-1. The database 318-1 is, in embodiments, a memory for storing information related to the data being archived. The database 318-1 may include HDDs, ROM, RAM or other memory either internal to the network storage system 302 and/or the archival management system 310-1 or separate as a discrete component addressable by the archival management system 310-1. The information stored in the database 318-1, in embodiments, includes one or more of, but is not limited to, data identification, application server identification, time of storage, removable disk drive identification, data format, encryption keys, application layer partition organization, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310-1. The archival management system 310-1, in embodiments, sends the data to one or both of the active archive 314-1 and/or the archiving system 312-1 to be archived.

Figure 4:
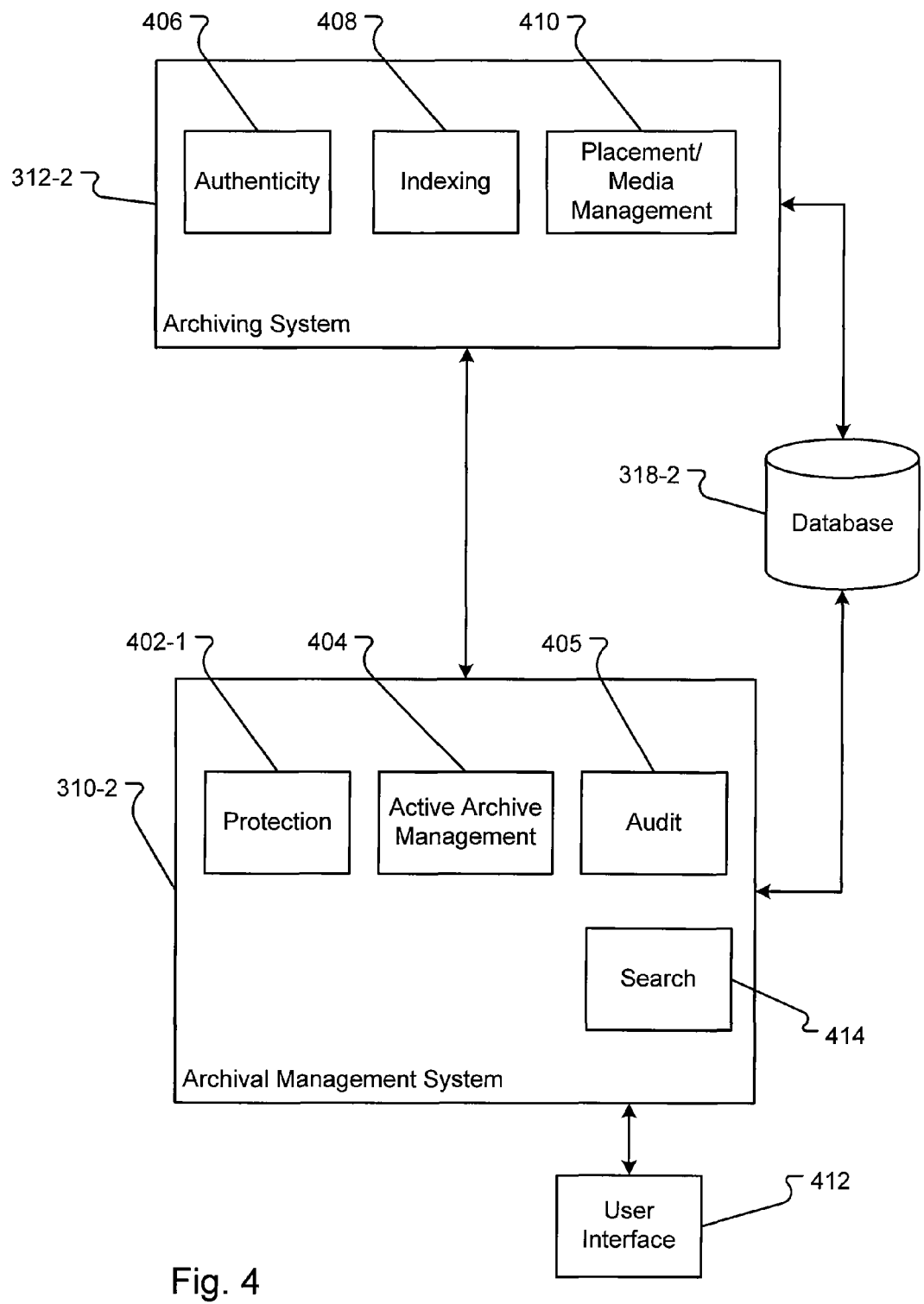
FIG. 4 is a set of block diagrams of embodiments of an archival management system and an archiving system.

Embodiments of an archival management system 310-2 and an archiving system 312-2, including one or more components or modules, are shown in FIG. 4. In embodiments, the archival management system 310-2 comprises one or more of a protection module 402-1, an active archive management module 404, an audit module 405, and a search module 414. In embodiments, the protection module 402-1 protects access to the archiving system 302 (FIG. 3) by applications, application servers, or other components on the network. For example, the protection module 402-1 prohibits a user from accessing the archiving system 312-2 if the archiving system 312-2 is a closed system. Thus, the protection module 402-1 may authenticate a system, determine access rights of the system, perform decryption of data, and other processes.

Figure 5:
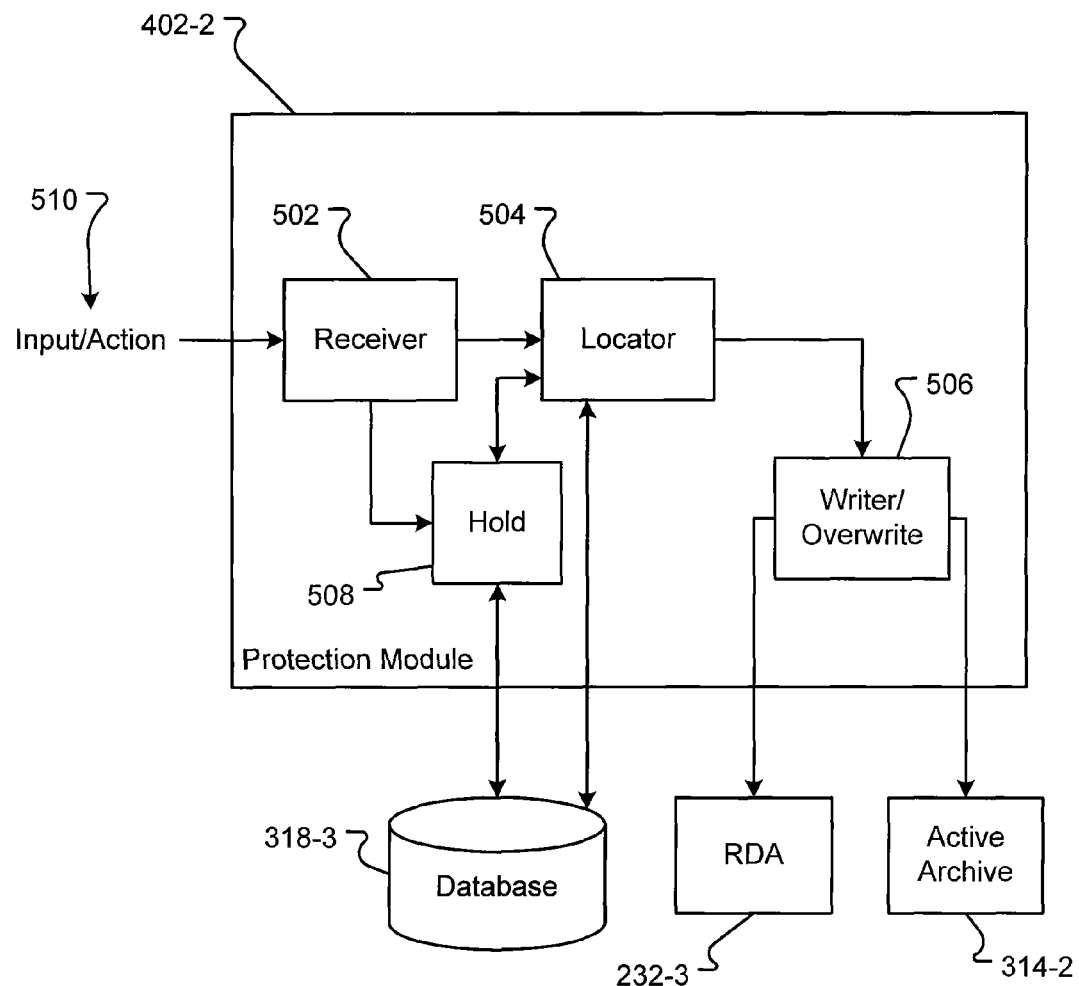
FIG. 5 is a block diagram of an embodiment of a protection module in an archiving system for digitally shredding archived data.

The active archive management module 404, in embodiments, manages data written to and read from the active archive 314-2 (FIG. 5). In embodiments, the active archive management module 404 determines if archival data should be written to the active archive 314-2 (FIG. 5) based on information provided by the application server or on information stored in the database 318-2. In further embodiments, the active archive management module 404 determines when data in the active archive 314-2 (FIG. 5) is removed from the active archive 314-2 (FIG. 5), as explained in conjunction with FIGS. 5-10. According to information in the database 318-2, one or more items of data may only reside in the active archive 314-2 for a predetermined period of time, for example, three months.

The audit module 405, in embodiments, stores data about the archival data stored in the archiving system 312-2 and active archive 314-2 (FIG. 5). In embodiments, the audit module 405 records information, for example, the application server that sent the data, when the data was received, the type of data, where in the archiving system 312-2 the data is stored, where in the active archive 314-2 (FIG. 5) the data is stored, the period of time the data will be stored in the active archive 314-2 (FIG. 5), etc. The audit module 405 can provide a "chain of custody" for the archived data by storing the information in the database 318-2.

In embodiments, the search module 414 receives inputs from a user using a user interface 412 and searches the database 318-2 in response to the inputs. For example, the user may want to know all files associated with a prescribed author that are stored in the archive. In other embodiments, the search module 414 searches the metadata or data about the files in the archive to find the author and the files associated with the author. The search module 414 may then return the list of files found.

The archiving system 312-2, in embodiments, includes one or more of an authenticity module 406, an indexing module 408, and/or a placement/media management module 410. In embodiments, the authenticity module 406 determines if a removable disk drive is safe to connect with the archiving system 312-2. For example, the authenticity module 406 may complete an authentication process, such as, AES 256, a public-key encryption process, or other authentication process, using one or more keys to verify that the inserted removable disk drive has access to the archiving system 312-2.

The indexing module 408, in embodiments, creates application layer partitions in the RDA 232-1 (FIG. 2) to provide storage areas for different data. For example, the indexing module 408 selects one or more removable disk drives to form one or more "drives". "Drive A:\" may comprise one or more removable disk drives, while "Drive B:\" and "Drive C:\" may also include one or more removable disk drives. In embodiments, each drive is associated with an application layer partition of the RDA 232-1 (FIG. 2). There may be fewer than three application layer partitions of the RDA 232-1 (FIG. 2) or more than three application layer partitions of the RDA 232-1 (FIG. 2). In embodiments, each drive or application layer partition stores only a predetermined type of data that relates to one or more application servers. For example, Drive A:\ stores email data, while Drive B:\ stores Health Insurance Portability and Accountability Act (HIPAA) data.

In further embodiments, the active archive management module 404 creates application layer partitions in the active archive 314-2 (FIG. 5) that are associated with the application layer partitions in the RDA 232-1 (FIG. 2). For example, the active archive management module 404 selects portions of the active archive 314-2 (FIG. 5) to form one or more "drives" that are associated with the drive(s) in the RDA 232-1 (FIG. 2). In embodiments, the active archive's "Drive A:\" is associated with Drive A:\ in the RDA 232-1 (FIG. 2), while "Drive B:\" and "Drive C:\" also are associated with Drive B:\ and Drive C:\, respectively, in the RDA 232-1 (FIG. 2). In embodiments, each active archive drive is associated with an application layer partition of the active archive 314-2 (FIG. 5). There may be fewer than three application layer partitions of the active archive 314-2 (FIG. 5) or more than three application layer partitions of the active archive 314-2 (FIG. 5). In embodiments, each drive or application layer partition stores the same type of data as the application layer partitions in the RDA 232-1 (FIG. 2). Continuing the example above, Drive A:\ stores email data, while Drive B:\ stores clinical trial data, which is the same as the application layer partitions in the RDA 232-1 (FIG. 2).

The application server(s) can view the application layer partitions in both the active archive 314-2 and the RDA 232-1 (FIG. 2) and, as such, views the active archive 314-2 (FIG. 5) and the RDA 232-1 (FIG. 2) as a virtual archiving system with a separate, independent drive inside the active archive 314-2 (FIG. 5) and the RDA 232-1 (FIG. 2) for the application server. One application server may only access the one or more drives related to the data the application server archives and may not access other drives not associated with the data the application server archives.

In further embodiments, the active archive management module 404 provides controls for each drive in the active archive 314-2 (FIG. 5). How data is archived for one type of data may be different from how a second type of data is archived. For example, an organization (e.g., the SEC) may require email to be stored for seven (7) years while the Department of Health and Human Services (HHS) may require HIPAA data to be stored for six (6) months. The active archive management module 404 can manage each drive differently to meet the requirements for the data. For example, the active archive management module 404 may store email on drive A:\ for seven (7) years and store clinical trial data on drive B:\ for six (6) months. The active archive management module 404, in embodiments, stores information about which portions of the active archive 314-2 (FIG. 5) comprise the separate application layer partitions and enforces the controls on those portions of the active archive 314-2 (FIG. 5). Other controls enforced by the active archive management module 404 may include the format of data stored on a drive, whether data is encrypted in the active archive 314-2 (FIG. 5), when and how data is erased from the active archive 314-2 (FIG. 5), etc. In a further embodiment, the indexing module 408 performs the same or similar functions for the RDA 232-1 (FIG. 2).

In embodiments, the placement/media management module 410 manages the removable disk drives in the RDA 232-1 (FIG. 2). For example, the placement/media management module 410 determines when cartridges need replacing because the removable disk drive is at or near capacity. In embodiments, the placement/media management module 410 also separately addresses the removable disk drives and provides the addressing information to the indexing module 408 for storing data in the correct application layer partition. In further embodiments, the placement/media management module 410 can overwrite or alter data to make the data on the removable disk drive irretrievable. The overwriting or erasing of data is called digital shredding and is explained in conjunction with FIGS. 5-10.

An embodiment of a protection module 402-2 is shown in FIG. 5. The protection module 402-2, in embodiments, comprises one or more of, but is not limited to, a receiver module 502, a locator module 504, a hold module 508, and a writer module 506. The receiver module 502 can receive inputs or actions 510 being processed by the network storage system 302 (FIG. 3). An action 510 can be any process completed by the network storage system 302 (FIG. 3), but, in embodiments, is a digital shred action or an action to create a legal hold. For example, an action 510 may be a request to delete data in the network storage system 302 (FIG. 3).

The receiver module 502, in embodiments, receives an input 510 from the user interface 412 (FIG. 4). The input 510 can be a request to establish a legal hold, a request to digitally shred data, a request to remove a legal hold, or other type of action. The receive module 502 receives the input 510 and responds to the input 510. In an embodiment, the receiver module 502 determines that the input 510 is associated with a legal hold and forwards the input 510 to a hold module 508. In alternative embodiments, the receiver module 502 determines that the input 510 is associated with a digital shred action and forwards the input 510 to the locator module 504.

The hold module 508 executes actions associated with legal holds. In an embodiment, the hold module 508 receives a request to create a legal hold from the receiver module 502. The hold module 508 may then locate the data in the database 318-3 and establish a legal hold flag for the data. In one embodiment, the user inputs search criteria into a user interface 412 (FIG. 4), the results of the search identify the data associated with the legal hold. For example, the user searches for all files having a predetermined author. The files having that author are requested to have a legal hold applied. Thus, the files with the author are the input to the hold module 508. In further embodiments, the hold module 508 also intercepts inputs to the receiver module 502. The hold module 508 may then check in the database 318-3 if the data associated with the input 510 has a legal hold applied. If the data does have a legal hold, the hold module 508 can inform the locator module 504 to ignore or fail to execute the an action that the receiver module 502 forwards where the action may alter, delete, or digitally shred data.

The locator module 504, in embodiments, receives the input from the receiver module 502. In embodiments, the locator 504 determines the location for the one or more data elements associated with the input 510 received from the receiver module 502. The location of the data may be in the active archive 314-2 and the RDA 232-3. As such, the location may be one or more memory addresses in the active archive 314-2. Further, the location in the RDA 232-3 may be a removable disk drive identification, a partition, a memory address in the removable disk drive, etc. In embodiments, the locator module 504 searches the database 318-3 for the location of the data. For example, the locator module 504 searches the database 318-3 for the data element identifier and reads the memory or RDA locations associated with the data element identifier. In other embodiments, the locator module 504 searches the active archive 314-2 and/or the RDA 232-3 to locate the data.

In embodiments, the writer module 506 competes the digital shred. The writer module 506 can complete an overwrite procedure to digitally shred the data. The writer module 506 receives the memory locations from the locator module 504. In embodiments, the digital shred is an overwrite as prescribed by DOD 9015. For example, the overwrite may be a write of random digital ones (1) and zeros (0) to the memory locations where the data is stored. One or more other overwrites are possible and contemplated. Once overwritten, the writer module 506 may report that the data is digitally shredded and open the memory addresses in the active archive 314-2 or in the RDA 232-3 for future storage.

Figure 6:
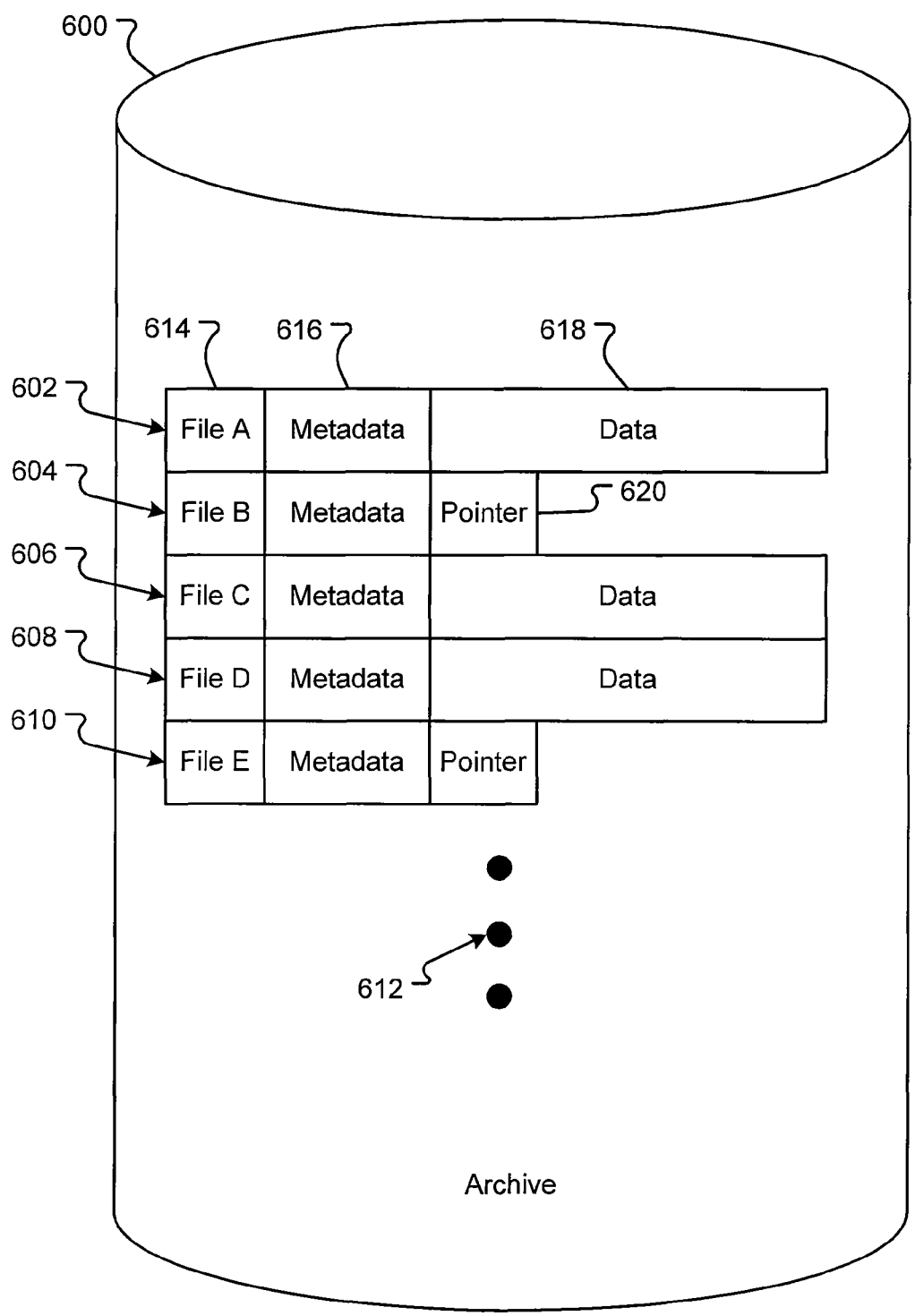
FIG. 6 is a block diagram of an embodiment of information elements stored in the network storage system archive.

An embodiment of an archive 600 having one or more data structures for one or more files is shown in FIG. 6. In embodiments, the archive 600 is a representation of the memory in the active archive 314-1 (FIG. 3) and/or the RDA 232-2 (FIG. 3). In the example presented in FIG. 6, there are five data structures 602, 604, 606, 608, and 610 that represent files or "information elements" stored in an archive 600. There may be fewer files than those shown in the exemplary archive 600 or one or more other files may exist in the archive 600 as represented by the ellipses 612.

In embodiments, a file data structure 602 may comprise a file identifier 614, file metadata 616, and file data 618. A file identifier 614 may be any identifier of the file, for example a file GUID. The file metadata 616, in embodiments, includes the information or attributes about the file, for example, the file size, file location, file save date and time, file creation date and time, file creator, etc. File data 618 can include the archived data sent from the application server. In embodiments, file A 602, file C 606 and file D 608 include file data.

File B 604 and file E 610, in embodiments, have been converted into stub files. In embodiments, a stub file has at least a portion of the file data eliminated. The archival management system 3101 (FIG. 3) or the active archive system 314-1 (FIG. 3) may create the stub files. In one embodiment, the file data is replaced with a pointer 620, which provides a link or other information to retrieve the file from another location, for example, the RDA 232-1 (FIG. 2). In other embodiments, the file data is eliminated without replacing the file data with a pointer 620. Other parts of the file may also be eliminated, for example, the file metadata and/or the file identifier. If the file identifier or file metadata is eliminated, a record of the file, in embodiments, is recorded in the database 318-1 (FIG. 3) to ensure that the archival management system 310-1 (FIG. 3) does not search for the file in the archive 600. In embodiments, if a digital shred is completed on a stubbed file, the stubbed file is overwritten regardless of the file not containing all of the file data.

Figure 7:
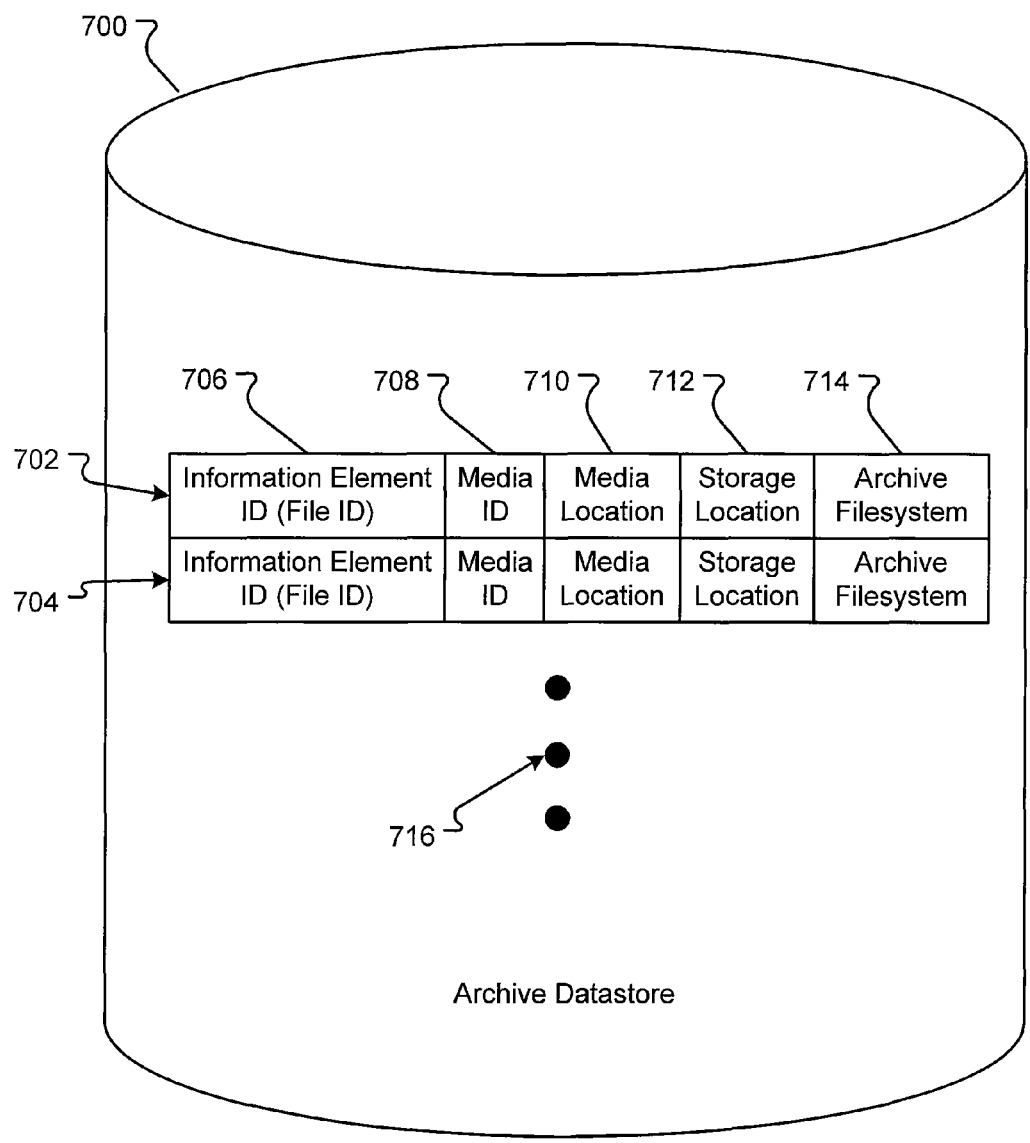
FIG. 7 is a block diagram of an embodiment of an archive datastore.

Embodiments of a database 700, similar or the same as database 318-3 (FIG. 5), comprising one or more data structures for storing information about the data in the RDA and/or active archive is shown in FIG. 7. The database 700 can be an archive table or other data structure for storing the information described herein. In an embodiment, the database 700 includes one or more data item fields 702 and 704 that represent the separate data items that are stored in the RDA and/or the active archives There may be fewer or more than two data item fields 702 and 704 as represented by the ellipses 716. Each data item field 702 and 704 may have one or more fields containing metadata or information about the data items represented by the data item fields 702 and 704.

In embodiments, a data item field 702 may comprise one or more of, but is not limited to, an information element identifier 706, a media identifier 708, a media location 710, a storage location 712 and/or a file system identifier 714. The information element identifier 706, in embodiments, includes an identifier that can be used by network storage system 202 (FIG. 2) to identify the data file or element of data that was stored in the RDA 232-1 (FIG. 2) or the active archive 314-1 (FIG. 3). The information element identifier 706 may also be referred to as a file identifier herein but does not limit the information element identifier 706 to identifying only files. The information element identifier 706 may identify any type of data structure. In one embodiment, the information element identifier 706 is a GUID for the data element. In another embodiment, the information element identifier 706 is a file name assigned to the data element. For example, data item field 702 represents data item 1, and the information element identifier 706 would be "file a". In other embodiments, the entity storing the data item in the network storage system 202 (FIG. 2) provides the file name that is stored in the information element identifier 706.

Further embodiments of the data item field 702 include a media identifier 708. In embodiments, the data is stored in one or more removable disk drives 102-2 (FIG. 2) and/or one or more locations in the active archive 314-1 (FIG. 3). The media identifier 708 may include a listing of the one or more removable disk drives 102-2 (FIG. 2) that store the data. Further embodiments also include at least an identification that the data is also stored in the active archive 314-1 (FIG. 3). The listing of the one or more removable disk drives 102-2 (FIG. 2) may be a list of identifiers that are both an electronic identifier and a physical identifier for the removable disk drive(s). For example, the electronic identifier, which is used by the processor of the network storage system 202 (FIG. 2) to identify the removable disk drive 102-2 (FIG. 2) is the same as the SKU printed on a label affixed to the removable disk drive 102-2 (FIG. 2) cartridge. In this way, the network storage system 202 (FIG. 2) may request the removable disk drive 102-2 (FIG. 2) from an administrator using the identifier. In other embodiments, the electronic identifier and the physical identifier are different but associated in a table in the media identifier field 708.

A media location field 710, in embodiments, records the location of the media. A removable disk drive 102-2 (FIG. 2) may be removed from a drive port 110-2 (FIG. 2) and physically stored in another location. The media location 710 can record the drive port 110-2 (FIG. 2) of where the media is inserted or should be inserted. For example, the media location field 710 stores the drive port number for the network storage system 202 (FIG. 2).

A storage location field 712 may include the physical storage location of the removed disk drive 102-2 (FIG. 2). For example, the media location 710 field includes the name of the storage entity, e.g., Acme Storage, a location for the storage location, e.g., Missoula, Mont., and/or a room or safe where the media is stored, e.g., Storage Room 109.

A file system identifier 714, in embodiments, stores the file system used for the media. For example, the file system identifier 714 stores an identifier for the NTFS. The removable disk drives 102-2 (FIG. 2) may be removed from the network storage system 202 (FIG. 2) and physically stored for an extended period (years or decades). The file system used by the network storage system 202 (FIG. 2) when the data was stored may have changed. However, using the file system identifier 714, an upgraded network storage system 202 (FIG. 2) can load or use the older file system to retrieve information from the newly inserted removable disk drive 102-2 (FIG. 2).

Figure 8:
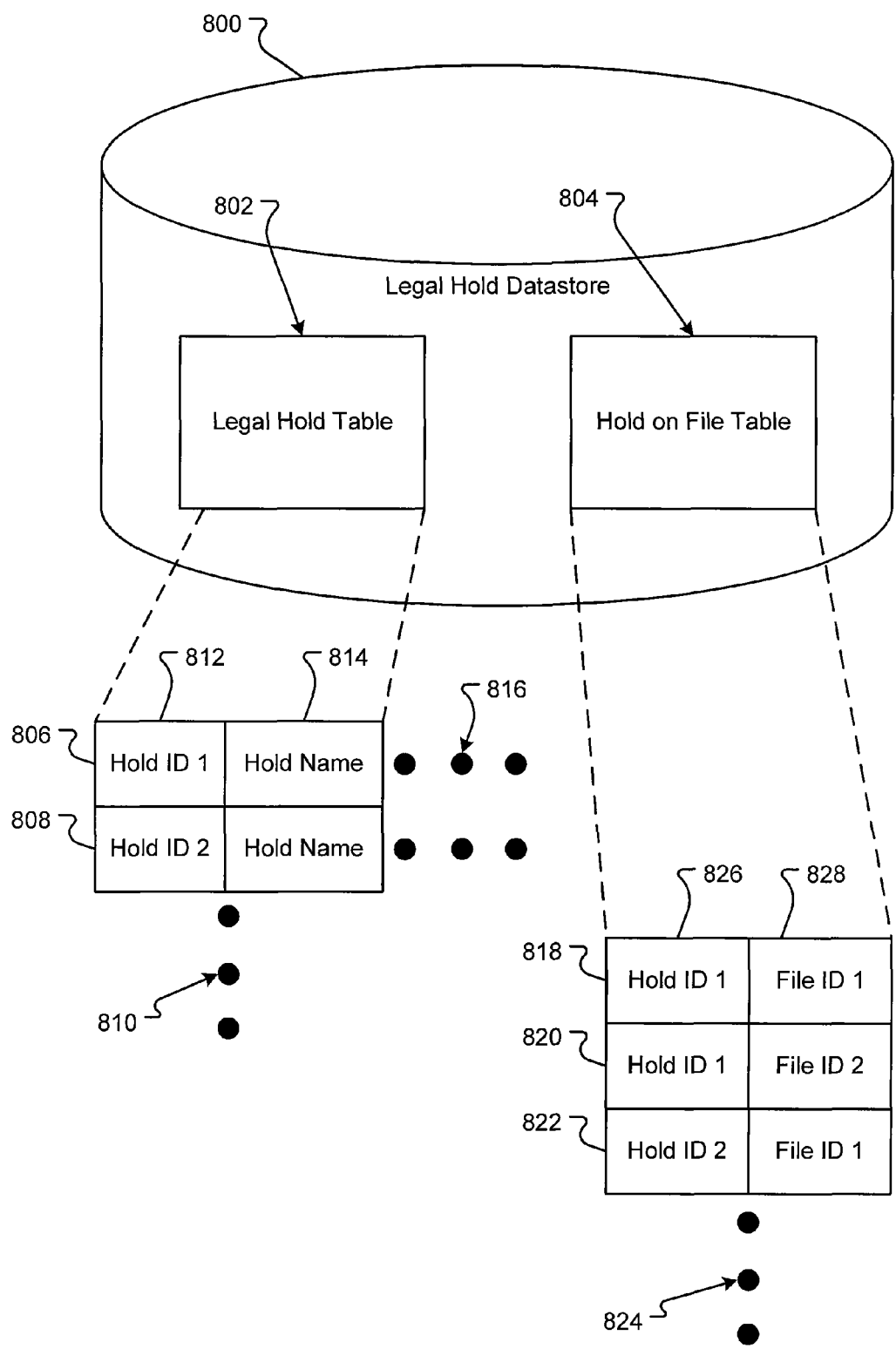
FIG. 8 is a block diagram of an embodiment of a legal hold datastore.

An embodiment of a legal hold datastore 800 having one or more data structures for one or more legal holds is shown in FIG. 8. The legal hold datastore 800, in embodiments, includes a legal hold table 802 and a hold on file table 804. There may be more or fewer data tables than those shown in the exemplary legal hold datastore 800.

In embodiments, the legal hold table 802 is a listing of all legal holds applicable to data in the network storage system 202 (FIG. 2). The legal hold table 802 comprises one or more legal hold data fields 806 and 808. In embodiments, the legal hold table 802 includes more than the two legal hold data fields 806 and 808 as represented by the ellipses 810. The legal hold data field 806 includes one or more fields, including a hold identifier 812 and a hold name 814. In embodiments, the legal hold data field 806 includes more fields as represented by the ellipses 816.

The hold identifier 812, in embodiments, includes an identifier that can be used by network storage system 202 (FIG. 2) to identify the hold being placed on data in the network storage system 202 (FIG. 2). In one embodiment, the hold identifier 812 is a GUID for the data element. In another embodiment, the hold identifier 812 is a name assigned to the hold. For example, the hold identifier 812 is "hold a". In other embodiments, the entity placing the hold on a data item in the network storage system 202 (FIG. 2) provides the hold name that is stored in the hold identifier 812.

The hold name 814 can be the name of hold used by an outside entity. For example, while the hold identifier 812 identifies the hold to the network storage system 202 (FIG. 2), the hold name 814 may identify the hold to the outside entity. The hold name 814, in embodiments, is the case name, case identifier, or other information identifying the case in the court that required the legal hold.

In embodiments, the legal hold datastore 800 also includes a hold on file table 804. The hold on file table 804 can associate a legal hold with a file or data element. In embodiments, the hold on file table 804 includes one or more associated hold fields 818, 820, and 822. There may be more or fewer hold fields 818, 820, and 822 in the hold on file table 804 as represented by ellipses 824. In embodiments, a hold field 818 includes a hold identifier 826 and a file identifier 828.

A hold identifier 826 identifies the legal hold. In embodiments, the hold identifier 826 is the hold identifier 812 in the legal hold table 802. In other embodiments, the hold identifier 826 is a pointer to the hold identifier 812 in the legal hold table 802. The file identifier 828 identifies the file that has the legal hold applied. In embodiments, the file identifier 828 is the information element identifier 706 (FIG. 7) in the database 700 (FIG. 7). The file identifier 828 may also be a pointer to the information element identifier 706 (FIG. 7) in the database 700 (FIG. 7). More than one hold may be applied to each information element, and each hold may be applied to more than one information element. For example, a first legal hold, "Hold 1," in hold fields 818 and 820 applies to both a "file 1" and a "file 2." Further, "file 1" has a second hold, "hold 2," shown in hold field 822. Any combination of holds and files is possible and can be recorded in the hold on file table 804.

Figure 9:
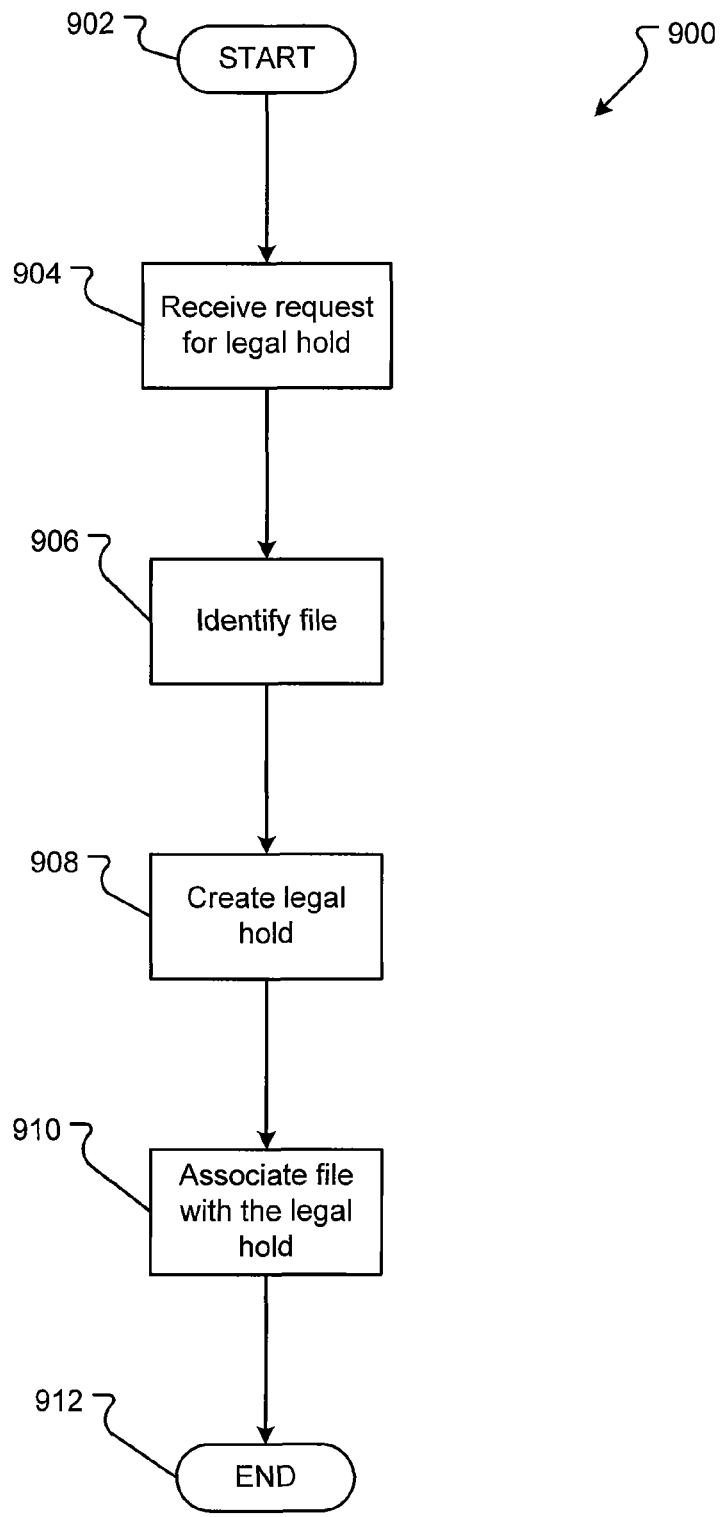
FIG. 9 is a flow diagram of an embodiment of a method for creating a legal hold.

An embodiment of a method 900 for setting a legal hold is shown in FIG. 9. In embodiments, the method 900 generally begins with a START operation 902 and terminates with an END operation 912. The steps shown in the method 900 may be executed in a computer system as a set of computer executable instructions. While a logical order is shown in FIG. 9, the steps shown or described can, in some circumstances, be executed in a different order than presented herein.

Receive operation 904 receives a request for a legal hold. In embodiments, the archival management system 310-1 (FIG. 3) receives one or more instructions to create a legal hold on data in the RDA 232-2 (FIG. 3) and/or the active archive 314-1 (FIG. 3). The user may enter the legal hold request in the user interface 412 (FIG. 4) for the archival management system 310-1 (FIG. 3). In embodiments, the user also provides other information, such as the file identifier or metadata to locate the file. In embodiments, the receiver module 502 (FIG. 5) of the protection module 402-2 (FIG. 5) receives the request.

Identify operation 906 identifies the file subject to the legal hold. In one embodiment, the user provides the file identifier with the legal hold request. In an alternative embodiment, the user provides search criteria for the search module 414 (FIG. 4). For example, the user desires to place a legal hold on all files with a predetermined author. The user provides the name of the author to the search module 414 (FIG. 4). The search module then searches the database 318-2 (FIG. 4) for files with the author. One or more files returned from the search may be identified as requiring a legal hold. In embodiments, a hold module 508 (FIG. 5) identifies the files in the database 318-3 (FIG. 5).

Create operation 908 creates the legal hold. In embodiments, the archival management system 310-1 (FIG. 3) creates a legal hold table 802 (FIG. 8) if a legal hold table does not exist in a legal hold datastore 800 (FIG. 8). The legal hold datastore 800 (FIG. 8), containing the legal hold table 802 (FIG. 8), may be stored in the database 318-2 (FIG. 4). The archival management system 310-1 (FIG. 3) requests information from the user for the legal hold table 802 (FIG. 8), that is, the name of the legal hold to be placed in the legal hold name field 814 (FIG. 8). The archival management system 310-1 (FIG. 3) can create and store a legal hold identifier 812 (FIG. 8) into the legal hold table 802 (FIG. 8). In embodiments, a hold module 508 (FIG. 5) creates the legal hold datastore 800 (FIG. 8) and the contents therein.

Associate operation 910 associates the legal hold with one or more files. The archival management system 310-1 (FIG. 3), in embodiments, creates a hold on file table 804 if one does not exist. Using the files identified by the user or returned from the search, the archival management system 310-1 (FIG. 3) can create a hold field 818 (FIG. 8) for each file associated with the legal hold. Then, the archival management system 310-1 (FIG. 3) pairs the file identifiers with the hold identifiers, in the hold fields 818, to associate the legal hold with a file. In embodiments, the hold module 508 (FIG. 5) associates the files and holds.

Figure 10:
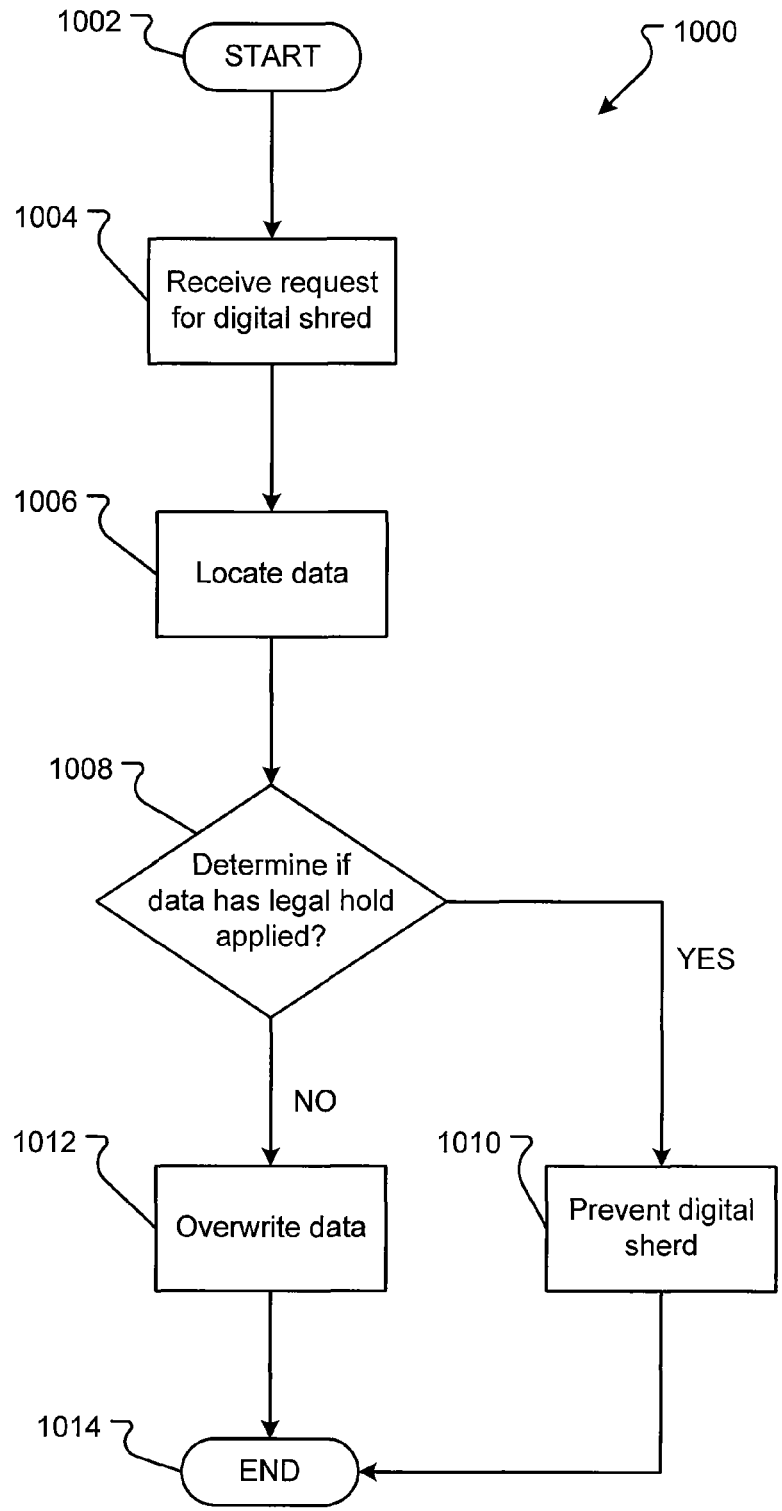
FIG. 10 is a flow diagram of an embodiment of a method for digitally shredding information elements in a network storage system.

An embodiment of a method 1000 for digitally shredding data is shown in FIG. 10. In embodiments, the method 1000 generally begins with a START operation 1002 and terminates with an END operation 1014. The steps shown in the method 1000 may be executed in a computer system as a set of computer executable instructions. While a logical order is shown in FIG. 10, the steps shown or described can, in some circumstances, be executed in a different order than presented herein.

Receive operation 1004 receives a request to digitally shred one or more items of data or information elements. In embodiments, the archival management system 310-1 (FIG. 3) receives one or more instructions to digitally shred data in the RDA 232-2 (FIG. 3) and/or the active archive 314-1 (FIG. 3). The user may enter the digital shred request in the user interface 412 (FIG. 4) for the archival management system 310-1 (FIG. 3). In embodiments, the user also provides other information, such as the file identifier or metadata to locate the file. This other information may be referred to as identifying information. In embodiments, the receiver module 502 (FIG. 5) receives the digital shred request.

Locate operation 1006 locates the one or more files or information elements subject to the digital shred. In one embodiment, the user provides identifying information, e.g., the file identifier, with the digital shred request. In an alternative embodiment, the user provides other identifying information, such as search criteria for the search module 414 (FIG. 4). For example, the user desires to digitally shred all files before a predetermined date. The user provides the date to the search module 414 (FIG. 4). The search module then searches the database 318-2 (FIG. 4) for files stored before the predetermined date. One or more files returned from the search may be identified as subject to the digital shred. The one or more files that are returned can then have the file identifiers and media locations and/or storage locations determined by reviewing the database 700 (FIG. 7). In embodiments, the locator module 504 (FIG. 5) locates the files with information forwarded by the receiver module 502 (FIG. 5).

The archival management system 310-1 (FIG. 3), once the files have been identified, can determine where the files are located. In embodiments, the archival management system 310-1 (FIG. 3) searches the database 700 (FIG. 7) for the file identifiers previously identified. The archival management system 310-1 (FIG. 3) reads the media identifier 708 (FIG. 7), media location 710 (FIG. 7), and/or storage location 712 (FIG. 7). If the storage location 712 (FIG. 7) is a remote location, the archival management system 310-1 (FIG. 3) may request the user or administrator to retrieve the media and reinsert the media into a drive port. If the media location 710 (FIG. 7) is a drive port, the archival management system 310-1 (FIG. 3) reads the location. The storage location 712 (FIG. 7) can also store the location in the media, i.e., a memory address, offset, or other location, of where the data is stored. In embodiments, the locator module 504 (FIG. 5) locates the data.

In embodiments, a removable disk drive 102 stored in a physically remote location should be reinserted into a drive port 10 before the digital shred is executed. The locator module 504 (FIG. 5) can request an administrator to reinsert the removable disk drive 102 into a drive port 110. The locator module 504 (FIG. 5) may then monitor the drive port(s) 110 for an insertion of the removable disk drive 102. Until the removable disk drive 102 is reinserted, the digital shred command is queued. Upon receiving a signal that a removable disk drive 102 has been inserted, the locator module 504 (FIG. 5) can determine if the removable disk drive 102 identifier matched the media ID 708 (FIG. 7). If the media ID 708 (FIG. 7) matches, the locator module 504 (FIG. 5) can send the overwrite request to the overwrite module 506 (FIG. 5).

Determine operation 1008 determines if a legal hold is applied to the data subject to the digital shred request. The archival management system 310-1 (FIG. 3), in embodiments, can search the hold on file table 804 (FIG. 8) in the legal hold datastore 800 (FIG. 8) for the file identifiers identified in the locate operation 1006. If an identified file identifier is in the file identifier field 828 (FIG. 8), the archival management system 310-1 (FIG. 3) flows the method YES to prevent operation 1010. If there are no identified file identifiers in the file identifier field 828 (FIG. 8), the archival management system 310-1 (FIG. 3) flows the method NO to overwrite operation 1012. In embodiments, the hold module 508 (FIG. 5) determines if a legal hold is applied.

Prevent operation 1010 prevents the digital shred. In embodiments, the archival management system 310-1 (FIG. 3) cancels the digital shred operation if a file has a legal hold. For example, the archival management system 310-1 (FIG. 3) removes the digital shred operation from the program stack or fails to execute the digital shred operation. In some embodiments, the archival management system 310-1 (FIG. 3) sends a notification to the requester that the digital shred was prevented from executing because of an established legal hold. The archival management system 310-1 (FIG. 3) may return, with the notification, the file identifier 706 (FIG. 7) and/or legal hold name 814 (FIG. 8) from the legal hold datastore 800 (FIG. 8). In embodiments, the hold module 508 (FIG. 5) signals the locator module 504 (FIG. 5) to forego sending the overwrite request to the overwrite module 506 (FIG. 5).

Overwrite operation 1012 overwrites the data. The archival management system 310-1 (FIG. 3) can overwrite the located data. In one embodiment, the archival management system 310-1 (FIG. 3) writes random bits to the location(s) identified for the data. The location of any stub files in the active archive 314-1 (FIG. 3) may also be overwritten. The archival management system 310-1 (FIG. 3), in embodiments, uses any known overwrite process that can obscure the data such that the data cannot be retrieved. In embodiments, the overwrite module 506 (FIG. 5) overwrites the memory locations.

Figure 11:
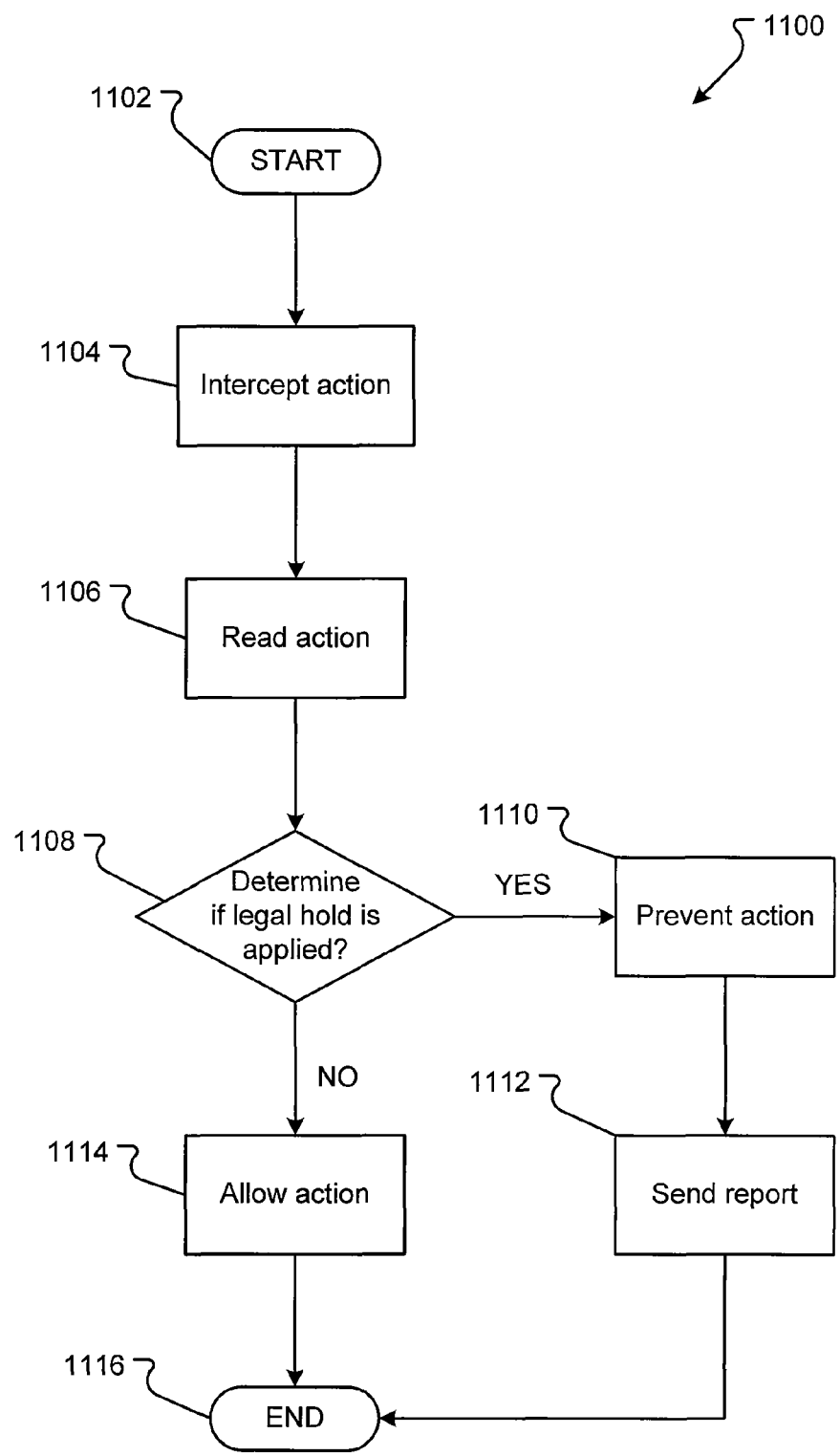
FIG. 11 is a flow diagram of an embodiment of a method for determining if a legal hold is applied to data.

An embodiment of a method 1100 for enforcing a legal hold is shown in FIG. 11. In embodiments, the method generally begins with a START operation 1102 and terminates with an END operation 1116. The steps shown in the method 1100 may be executed in a computer system as a set of computer executable instructions. While a logical order is shown in FIG. 11, the steps shown or described can, in some circumstances, be executed in a different order than presented herein.

Intercept operation 1104 intercepts an action. In embodiments, the archival management system 310-1 (FIG. 3) intercepts an action received at the network storage system 302 (FIG. 3) that either is placed into the program stack or before the action is placed in the program stack, which prevents the action from being placed in the program stack, at least temporarily. The archival management system 310-1 (FIG. 3), in embodiments, intercepts all actions to determine if the action violates a legal hold. In an alternative embodiment, the archival management system 310-1 (FIG. 3) only intercepts write actions or actions other than read actions that will alter the data associated with a legal hold. The receiver module 502 (FIG. 5), in embodiments, intercepts the action.

Read operation 1106 reads the information about the action. The archival management system 310-1 (FIG. 3), in embodiments, reads the metadata or data in the action. For example, the archival management system 310-1 (FIG. 3) reads the type of action. The receiver module 502 (FIG. 5), in embodiments, reads the data associated with the action.

Determine operation 1108 determines if the action will alter the data. In embodiments, the archival management system 310-1 (FIG. 3) determines from the read data if the action will alter the data in violation of the legal hold. In an alternative embodiment, the archival management system 310-1 (FIG. 3) determines if the action is something other than a read action. The hold module 508 (FIG. 5), in embodiments, determines if the action will violate the legal hold. If the action is an action other than a read action and violates the legal hold, the method flows YES to prevent operation 1110. If the action is a read action or something other than a write action and does not violate the legal hold, the method flows NO to allow operation 1114. In embodiments, the legal hold datastore is checked to determine if the application layer partition has a legal hold in the database. If the legal hold datastore does have a applicable legal hold, the action is reviewed to determine if the action will alter the existing data.

Prevent operation 1110 prevents the action. In embodiments, the archival management system 310-1 (FIG. 3) prevents the action in the program stack from executing. In other embodiments, the archival management system 310-1 (FIG. 3) removes the action from the program stack or prevents the action from being placed in the program stack. The prevention module 708 (FIG. 7), in embodiments, prevents the action.

Send operation 1112 sends a report. The archival management system 310-1 (FIG. 3), in embodiments, informs the application server or other entity that the action was prevented or did not execute. Thus, the application server or other entity does not mistakenly believe that the action was completed. In embodiments, the archival management system 310-1 (FIG. 3) sends a report to the application server. The legal hold module 508 (FIG. 5), in embodiments, sends the report.

Allow operation 1114 allows the action. In embodiments, the archival management system 310-1 (FIG. 3) allows the read of the data or action other than a write action to execute.

In light of the above description, a number of advantages of the present disclosure are readily apparent. For example, the media, which may be a HDD or other random access and reusable media may not be physically destroyed to eliminate the data. As such, the network storage system can maintain the media while still effectively eliminating the data. Further, the network storage system can also ensure that data involved in a legal case cannot be deleted. Thus, while data may be digitally shredded automatically after the expiration of some predetermined period of time, the data may be maintained if the data is subject to a legal hold. This legal hold security ensures compliance with court orders.

A number of variations and modifications can also be used. For example, a legal hold may be placed on entire application layer partitions to prevent deletion of all data associated with a predetermined application. For example, email has become an increasingly important source of information during court cases. A legal hold may be applied to all email data by placing a legal hold on the email application layer partition.

While the principles of the disclosure have been described above in connection with specific apparatuses and methods, it is to be clearly understood that this description is made only by way of example and not as limitation on the scope of the disclosure.

What is claimed is:

1. A network storage system for archiving data, the network storage system comprising:
   one or more removable disk drives, the one or more removable disk drives operable to store archival data, each removable disk drive comprising:
      a data cartridge case;
      a connector;
      an embedded memory, the embedded memory physically attached to the data cartridge case, the embedded memory electrically connected to the connector, the embedded memory operable to store archival data;
   one or more drive ports, each drive port including a data cartridge connector which mates with the connector to communicate with the embedded memory, the one or more drive ports in communication with one or more application servers, the one or more drive ports receiving the archival data from the one or more application servers and sending the archival data to the embedded memory for storage; and
   an archiving system appliance in communication with the removable disk drives, the archiving system appliance managing storage of the archival data stored in the one or more removable disk drives, the archiving system appliance receiving a request to digitally shred the archival data, and the archiving system appliance locating the archival data associated with the request and overwriting the archival data to digitally shred the archival data;
   the archiving system appliance being responsive to a legal hold associated with the archival data, whereby the archival data are associated with a legal suit, the legal hold being subject to creation or removal at any time after creation of the archival data, wherein, on receiving a request to digitally shred archival data stored before a predetermined date, the archival system determines if a subset of information elements stored in the archival data subject to the request has the legal hold applied, and:
      if the subset does not have the legal hold applied, the subset is overwritten to prevent the information elements in the subset from being retrieved; and
      if the subset has the legal hold applied, overwriting of the subset is prevented;
   wherein the archiving system appliance comprises an archival management system, the archival management system receiving the archival data from the one or more application servers, the archival management system determining where to store the archival data, the archival management system storing a location for where the archival data is stored to locate the archival data, the archival management system receiving a request to digitally shred the archival data, the archival management system locating the archival data associated with the request and overwriting the archival data to digitally shred the archival data;
   wherein the archival management system comprises a protection module, the protection module receiving the request to digitally shred the archival data, locating the archival data, and overwriting the archival data;
   wherein the protection module comprises:
      a receiver module, the receiver module receiving the request to digitally shred the archival data;
      a locator module, the locator module locating the archival data;
      a writer module, the writer module overwriting the archival data; and
      a hold module, the hold module intercepting requests to digitally shred archival data, determining if the legal hold is associated with the archival data, and, if the legal hold is associated with the archival data, preventing the archival data from being digitally shredded;
   wherein the hold module accesses a legal hold datastore to determine if the legal hold is associated with the archival data; and
   wherein the legal hold datastore comprises:
      a legal hold table, the legal hold table including one or more legal hold fields, the one or more legal hold fields including a hold identifier field and a hold name field comprising a case name or case identifier identifying a case in a court that required the legal hold; and
      a hold on file table, the hold on file table including one or more hold fields, each hold field including the legal hold identifier and a file identifier to associate the legal hold with the archival data.

2. A method, executable in a computer system, for establishing a legal hold on one or more information elements stored as archival data in a network storage system, the network storage system comprising one or more removable disk drives, the method comprising:
   receiving a request to create the legal hold, whereby the archival data are associated with a legal suit;
   identifying at least one of the one or more information elements associated with the request for the legal hold;
   creating the legal hold, the legal hold being subject to creation or removal at any time after creation of the archival data; and
   associating the legal hold with the at least one identified information element;
   receiving a request to digitally shred one or more of the information elements stored as the archival data before a predetermined date;

determining if a subset of one or more of the information elements associated with the request has the legal hold applied;

if the subset does not have the legal hold applied, overwriting the subset to prevent the one or more information elements in the subset from being retrieved; and if the subset has the legal hold applied, preventing overwriting of the subset;

wherein the request to create the legal hold includes an information element identifier; and wherein creating the legal hold comprises creating a legal hold field in a legal hold table, each legal hold field including a legal hold identifier field and a legal hold name field comprising a case name or case identifier identifying a case in a court that required the legal hold.

3. A method, executable in a computer system, for establishing a legal hold on one or more information elements stored as archival data in a network storage system, the network storage system comprising one or more removable disk drives, the method comprising:

receiving a request to create the legal hold, whereby the archival data are associated with a legal suit;

identifying at least one of the one or more information elements associated with the request for the legal hold;

creating the legal hold, the legal hold being subject to creation or removal at any time after creation of the archival data; and associating the legal hold with the at least one identified information element;

receiving a request to digitally shred one or more of the information elements stored as the archival data before a predetermined date;

determining if a subset of one or more of the information elements associated with the request has the legal hold applied;

if the subset does not have the legal hold applied, overwriting the subset to prevent the one or more information elements in the subset from being retrieved; and if the subset has the legal hold applied, preventing overwriting of the subset;

wherein the request to create the legal hold includes an information element identifier;

wherein creating the legal hold comprises creating a legal hold field in a legal hold table, each legal hold field including a legal hold identifier field and a legal hold name field comprising a case name or case identifier identifying a case in a court that required the legal hold; and wherein associating the legal hold comprises creating a hold on file table with one or more hold fields, wherein each hold field associates the information element identifier with the legal hold identifier field.

* * * * *